United States Patent

[11] 3,581,220

[72] Inventors Allan J. Bell
18 Old Post Road, Fairport, N.Y. 14450;
Roger B. Stone, 4207 Marble Lane,
Fairfax, Va. 22030

[21] Appl. No. 799,855
[22] Filed Feb. 17, 1969
[45] Patented May 25, 1971

[54] FREQUENCY MODULATION SIGNAL DEMODULATOR
8 Claims, 3 Drawing Figs.

[52] U.S. Cl. .......... 329/126,
178/66, 307/233, 325/320, 328/140, 329/103
[51] Int. Cl. .......... H04l 27/14
[50] Field of Search .......... 329/103, 126, 110, 102; 307/233; 328/140; 325/320; 178/66

[56] References Cited

UNITED STATES PATENTS 3,128,437 4/1964 Loughlin .......... 329/126X
3,235,812 2/1966 Tramposch .......... 329/126
3,353,102 11/1967 Meyers et al. .......... 178/66X
3,439,283 4/1969 Danielson .......... 329/104
3,491,305 1/1970 Stone .......... 329/126
3,493,877 2/1970 Jacobson .......... 326/126X

*Primary Examiner*—Alfred L. Brody
*Attorneys*—Paul M. Enlow, Ronald Zibelli, James J. Ralabate, Norman E. Schrader and Franklyn C. Weiss

ABSTRACT: In a data communication system a demodulator for use in detecting data information carried in a frequency modulated signal. A signal which had been modulated between upper and lower limits of frequency, in addition to other frequencies within or without the said limits for supervisory functions, would be received and by means of equalizers, a limiter, zero crossing detector, Schmitt trigger, and a low pass filter, the original data can be recovered from the received frequency modulated signal. Further, circuits are provided for providing phasing information and for detecting the presence or absence of the received carrier frequency signal.

INVENTORS
ALLAN J. BELL
ROGER B. STONE
BY Franklyn C. Weiss
ATTORNEY

FREQUENCY MODULATION SIGNAL DEMODULATOR

BACKGROUND OF THE INVENTION

In prior art facsimile systems documents to be transmitted are scanned at a transmitting station to convert information on the document into a series of electrical signals. These video signals are then coupled to the input of a communication link interconnecting a transmitter with a receiver. At a receiving location video signals selectively control the actuation of appropriate marking means to generate a facsimile of the document transmitted.

Data transmission in such a system is often accomplished by the use of the technique known as frequency modulation wherein the information is transmitted by assigning a different carrier frequency to each state of the data, i.e., mark and space, and transmitting the appropriate frequency for a period of time sufficient to insure reliable detection. Where the information includes levels of gray between the mark and space, or black and white signals, the frequency modulation signal is transmitted in a range between two limits of frequency, the frequencies therebetween relating directly to the level of gray detected and transmitted.

Transmission of the frequency modulated or frequency shift-keyed signals may be accomplished over any of the known transmission media, such as common carrier telephone lines, microwave installations, and direct wire, etc. At a receiving location the frequency modulated signals would be demodulated and detected in order to recover the original transmitted information.

One prior art technique of frequency demodulation is to employ frequency selective filters, which are tuned to the specific frequencies that were transmitted. With such a system, however, highly selective filters are necessarily expensive and have the inherent defect of a relatively long filter rise time. Further, such frequency selective filters are not efficient where the transmitted data ranges between an upper and lower limit of frequencies. Another prior art technique of frequency demodulation is to employ the well known ratio detector or discriminator circuit.

A further prior art technique is to detect the zero crossings of the long term average value of the incoming frequency modulated signals. Upon detection of the zero crossings, signals can be generated in response thereto and passed through an integrator which effectively takes the long term average value of the pulses. This average signal is the recovered data information from the input signal waveform.

While an FM signal is transmitted without amplitude modulation, transmission line characteristics, extraneous noise, and other transients on the line introduce some amplitude and phase variations into the transmitted frequency modulated signal. In order to accurately recover the transmitted data information, such amplitude and phase variations must be eliminated in order that the detection circuitry respond only to the frequency variations in the incoming signal. Once the phase and amplitude or other distortions have been effectively eliminated from the incoming frequency modulated signals, the data contained in the received signals must be accurately and efficiently detected in order to recover and effectively utilize the data contained in the transmitted signals.

OBJECTS

It is, accordingly, an object of the present invention to provide an improved frequency modulated signal demodulator.

It is another object of the present invention to increase the efficiency of a data transmission system utilizing frequency modulation.

It is another object of the present invention to improve the demodulation of frequency modulated signals in the presence of amplitude and phase or other distortion.

It is another object of the present invention to provide an accurate, efficient, and economical demodulator for frequency modulated facsimile signals transmitted over a medium including phase and amplitude distortion.

It is another object of the present invention to provide improved component circuits within a frequency modulated signal demodulator.

BRIEF SUMMARY OF THE INVENTION

In accomplishing the above and other desired aspects of the present invention, Applicants have invented improved apparatus for demodulating frequency modulated signals in the presence of amplitude and phase distortion together with the generation of signals utilized for phasing and the denoting the presence or absence of carrier frequency signals. The invention utilizes selectively designed circuits to effect the above aspects of the invention. The input data as received over a transmission medium would be applied to preamp, equalizer and amplitude limiting circuits to present signals of predetermined amplitude, while retaining the frequency modulation information, to specific detection circuitry. The amplitude limited signals would be presented to a differentiator to generate narrow pulses in accordance with the positive and negative going edges of the rectangular limited signals. These pulses would be then coupled to a zero crossing detector which would generate pulses of predetermined width in response to the pulses generated by the differentiating network. Coupled to the zero crossing detector would be a Schmitt trigger to generate rectangular shaped pulses of predetermined width in response to the pulses generated by the zero crossing detector. The pulses from the Schmitt trigger would be applied to a low pass filter which effectively integrates the signal to obtain the instantaneous average value of the rectangular pulses from the Schmitt trigger, thereby generating the output data information as is desired. The Schmitt trigger circuitry as utilized herein is a negative recovery one-shot circuit in that it may be recycled during a cycle in response to each of the input energizing pulses. Coupled to the low pass filter output are phase detection and carrier detection circuitry utilized for phasing and detection of the carrier signal for subsequent operation in a facsimile communication system, for example.

DESCRIPTION OF THE DRAWINGS

For a more complete understanding of the invention, as well as other objects and further features thereof, reference may be had to the following detailed description in conjunction with the drawings wherein:

Referring now to FIG. 1, there is shown the block diagram of the frequency modulation demodulator in accordance with the principles of the present invention. On the receive data input line would be the information as received from a communication link of any type known in the present art. That is, the communication link could comprise the common carrier telephone line, microwave links, direct wire, etc. Any means known in the prior art could be utilized for coupling the demodulator to the communication link, which is of no immediate concern in the present application. The received input data would be applied to the preamp 10 which amplifies the desired frequency band to the proper operating level. From the preamp 10 the signals are then coupled to a phase equalizer 12. This phase equalizer compensates for phase distortion and delay which might have been present in the incoming signal frequencies due to inherent characteristics of the transmission medium. From the phase equalizer 12, the signals are then coupled to an amplitude equalizer which compensates for amplitude attenuation which, similarly, occurs due to the inherent factors present in the transmission medium. A limiter 16 receives the equalized signals from amplitude equalizer 14 and is utilized to amplify and limit the signals to a predetermined amplitude. The output from limiter 16 is, therefore, a signal of the same immediate frequency as that applied to it but of a squared amplitude. From the limiter 16, the rectangular shaped signals are applied to amplifier 18 which raises the limited amplitude to a predetermined level necessary for subsequent operation of the circuit.

Figure 1:
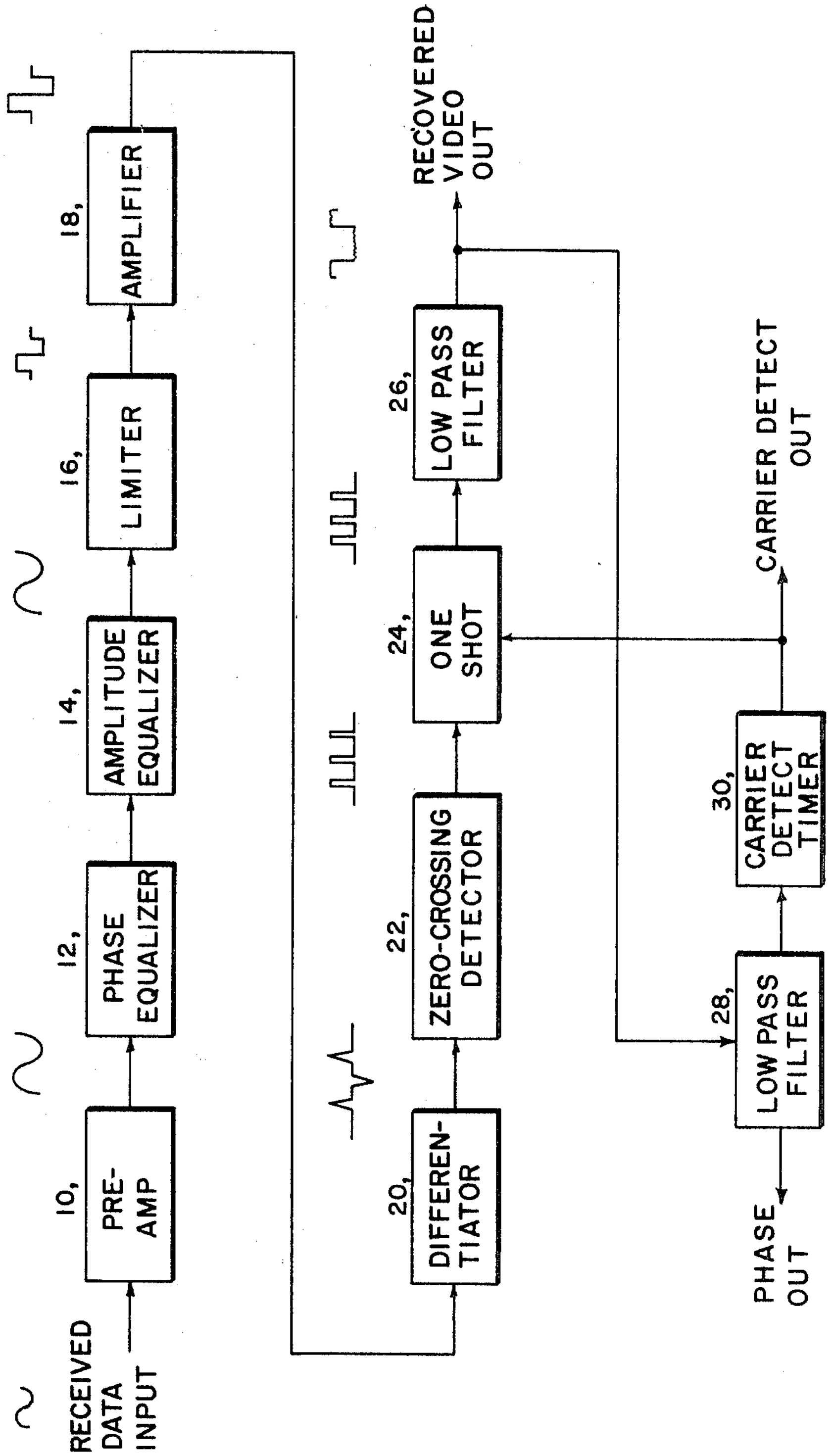
FIG. 1 is a block diagram of a demodulator circuit incorporating the principles of the present invention.

A differentiator 20 receives the amplified and limited signals and generates a pulse at each rectangular edge of the input signal. From the differentiator 20 the pulses generated therein are then coupled to a zero crossing detector which generates a positive narrow pulse in accordance with each edge of the square wave signal from amplifier 18 as generated by differentiator 20. The narrow pulses generated by the zero crossing detector are coupled to a one-shot circuit 24 or Schmitt trigger to generate fixed width signals in accordance with the zero crossings determined by the previous circuitry. This signal train of predetermined width signals is coupled to a low pass filter 26 which effectively integrates the output from the one-shot 24. Inasmuch as the signals received by the preamp 10 are frequency modulated, the low pass filter 26 will determine the information variations in the output from the one-shot 24 which is thus the recovered video information as would have been originally transmitted over the communication link, as hereinabove set forth. This recovered video output signal may be utilized to energize an appropriate marking or other type writing means in order to create a facsimile of the original document or the like transmitted.

Also coupled to the output of the low pass filter 26 is another low pass filter 28 which is utilized to generate phasing signals which may have been transmitted by a transmitting facsimile unit in order to synchronize the receiving writing means with the transmitter writing means. If, for instance, for a first predetermined time period prior to the transmission of video information, the transmitter transmitted a white pulse at the beginning or the end of each scan line of information, the low pass filter 28 and other phasing circuitry would look for black information interrupted by those white pulses for said predetermined time period to establish the correct phasing of the receiver with the transmitter.

The carrier detect timer circuit is also coupled to the low pass filter 28 in order to detect the carrier frequency signal before receipt of video information and to detect the loss of the carrier signal during the transmission of video information. If at any time the carrier detect timer circuit 30 denotes the loss of the transmitted carrier frequency, a signal is coupled to one-shot 24 disabling the circuit so that no incorrect video information is transferred to the printing means.

Figure 2:
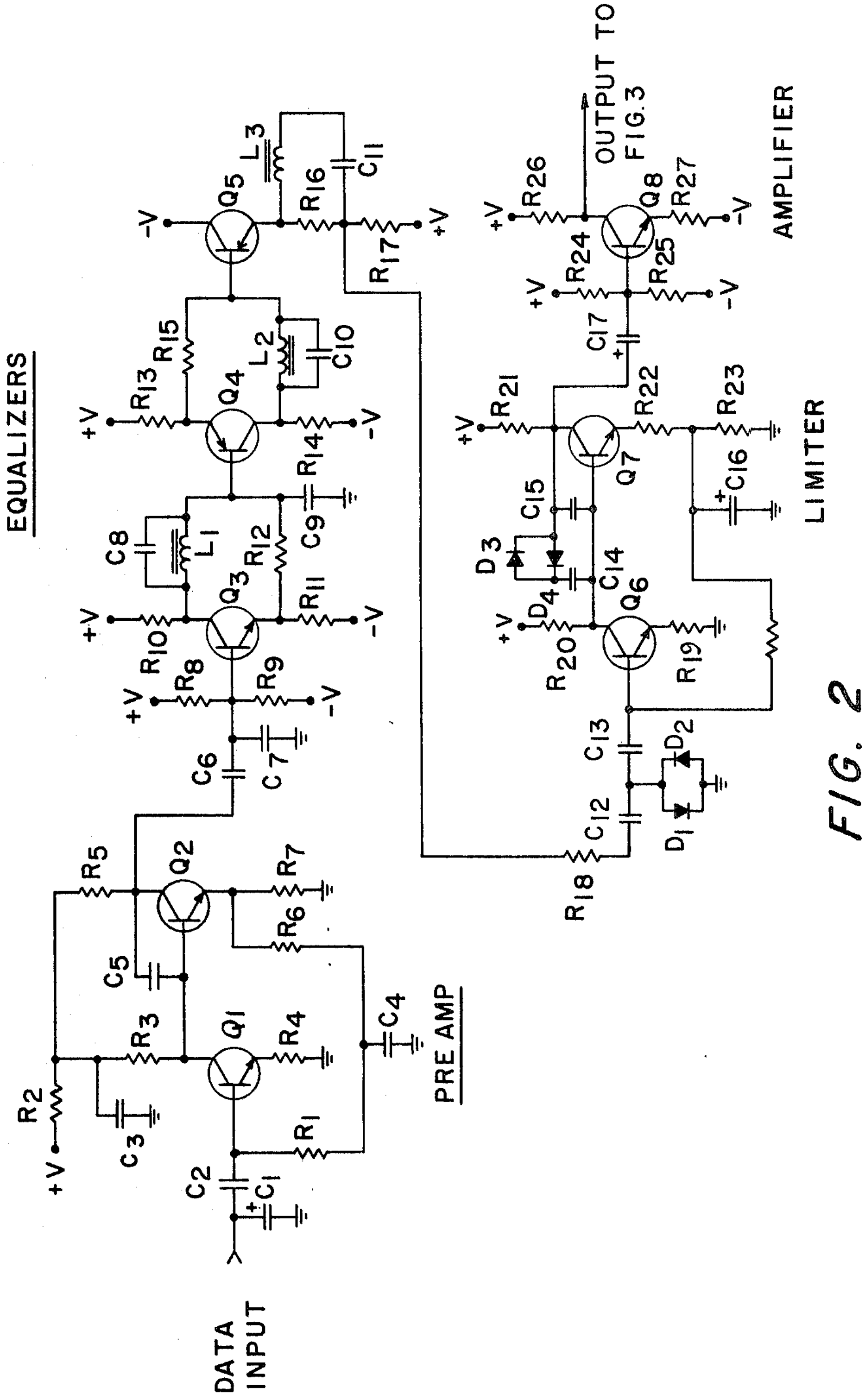
FIG. 2 is a schematic diagram of part of the block diagram shown in FIG. 1.
Figure 3:
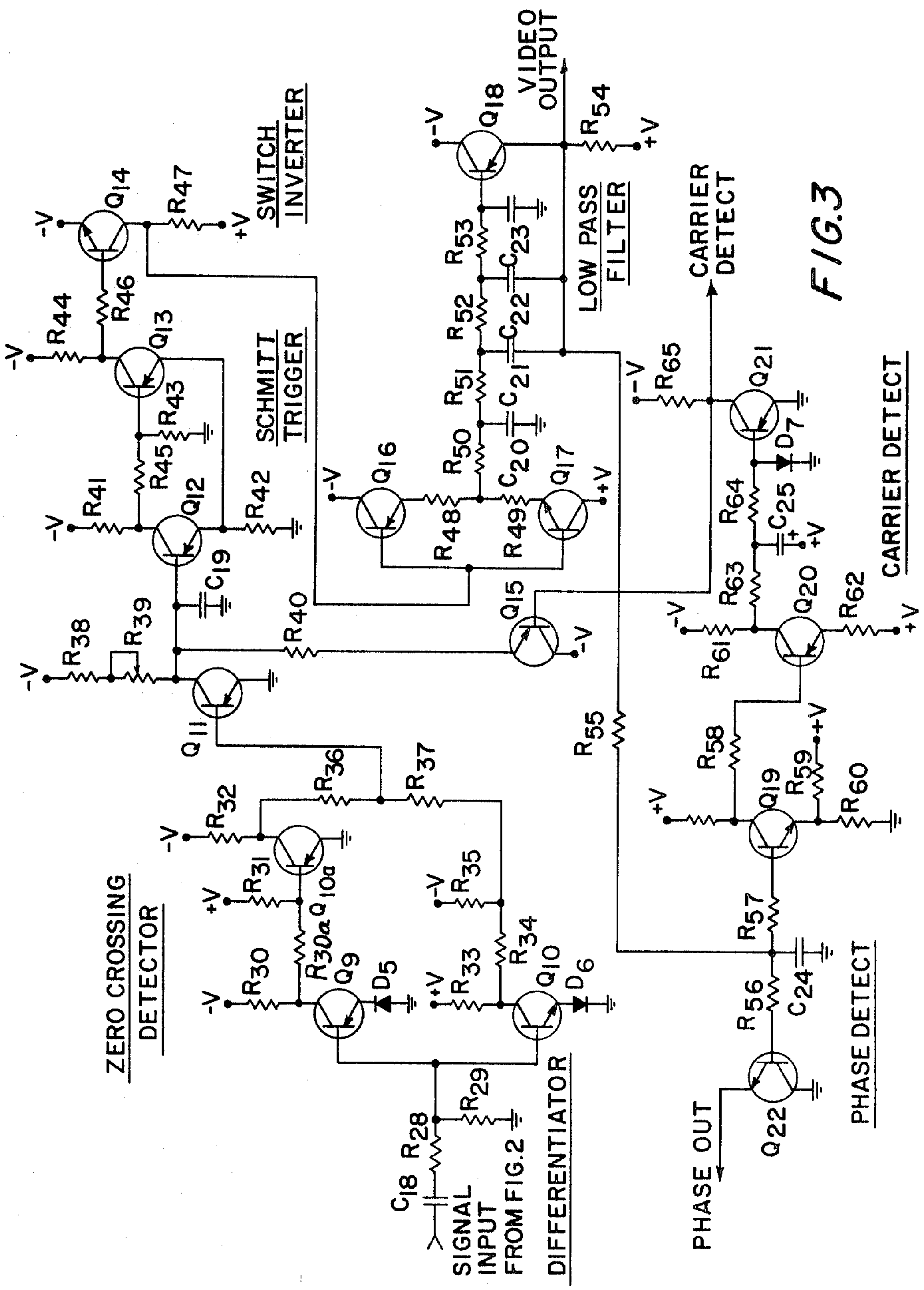
FIG. 3 is a schematic diagram of the other half of the block diagram shown in FIG. 1.

FIGS. 2 and 3 are specific schematic diagrams for the block diagram of the invention shown and described in conjunction with FIG. 1. The signals in the present application range from a 1500 Hz. FM signal denoting white information to a 2475 Hz. FM signal denoting black information. Signals between these two frequency limits denote various shades of gray from white all the way to black. Certain supervisory signals also appear such as the 1500 Hz. white and black frequency utilized for phasing described in conjunction with FIG. 1 and more particularly in conjunction with FIG. 3. A further supervisory signal might be an 1100 Hz. stop tone which would be transmitted from the transmitter to the receiver for purposes of indication that the receiver is to cease operation due to malfunction, etc., of the transmitter.

Inasmuch as the frequencies in the above paragraph and the attendant necessary sidebands thereof lie between 700 and 2700 Hz., frequencies below and above this upper and lower limit can be attenuated. Thus, the signals applied on the data input line in FIG. 2 are applied directly to capacitors C1 and C2. Capacitor C1 is utilized to rolloff, i.e. attenuate, frequencies applied to the circuit which lie above 2700 Hz. Capacitor C2 also acts as an input filter and passes on frequencies approximately 700 Hz. and above. These signals are then applied to transistor Q1 and associated resistors R2, R3, and R4 with capacitor C3. Resistors R2 and R3 are utilized to couple the transistor Q1 to the positive voltage supply +V. Capacitor C3 is utilized to filter out any AC signals which may appear on the DC supply voltage +V. After amplification by transistor Q1, the signals are applied to the base of transistor Q2 which is also coupled to the power supply through resistor R5 and to ground by resistor R7. Capacitor C5 is coupled between the collector and the base of transistor Q2 and is utilized to further filter or rolloff those signals above 2700 Hz. which may have reached this point in the circuit. A feedback bias network comprising resistors R1 and R6, and capacitor C4 is coupled from the emitter of transistor Q2 to the base of transistor Q1. Capacitor C4 is utilized to bypass to ground all signals which appear above approximately 700 Hz. Thus, to the range of frequencies which are important to the subsequent operation of the circuit, the signal applied through this feedback network to the base of transistor Q1 is a DC signal. Further, this feedback network operates to attenuate any signals which may appear in the input signal below approximately 500 to 700 Hz., while providing the bias voltage necessary for proper operation of the circuit.

The output from transistor Q2, now amplified, is coupled to the equalizing circuits which, as hereinabove set forth, operate to correct delay and amplitude distortion which may appear due to inherent characteristics of the transmission medium. Thus, the amplified signal output appearing at the collector of transistor Q2 is applied through coupling capacitor C6 and filter capacitor C7 to the first equalizer circuit which is an active phase equalizer circuit due to the presence of the transistor therein.

The phase equalizer circuit comprises transistor Q3 and associated resistors R8, R9, R10, R11, and R12, capacitors C8 and C9, and filter coil L1. The application of the positive and negative voltage supplied to the circuit through resistors R8, R10, and R9 and R11, respectively, allow the signal now to approach the range of the voltage supply from −V to +V rather than the range of ground to +V as for transistors Q1 and Q2. Another stage of phase equalization is provided by transistor Q4 together with resistors R13, R14, and R15, capacitor C10 and coil L2. The phase equalized signals are now applied to transistor Q5 which with resistors R16 and R17, capacitor C11, and coil L3 provide amplitude equalizing for the phase equalized signals from transistor Q4. The output from the amplitude equalizer is taken from the junction of resistors R16 and R17 where the signals are now at essentially the same amplitude with equalized phase depending, of course, upon the level of the input signal from the transmission line at the beginning of the circuit.

The signals are now applied to the limiter circuit comprising transistors Q6 and Q7. Before application to the limiter transistor Q6, the signals are applied to resistor R18 and capacitor C12 which is utilized to isolate any DC level potential which may appear on the input signals. Diodes D1 and D2 are utilized as high level limiters in the event that the input signal level to the circuitry is above a certain predetermined level, as when, for example, a short or highly efficient transmission medium is utilized. Capacitor C13 is utilized to isolate the DC potential in the transistor Q6 and Q7 circuitry from diodes D1 and D2. The signal applied to the base of transistor Q6 as the first stage of the limiter, may, for example, range between 5 volts and 50 millivolts peak to peak. This signal, to reiterate, is the phase and amplitude equalized input video signal as received by the demodulator circuitry described herein. Transistor Q6 is coupled to positive voltage supply +V and to ground through resistors R20 and R19, respectively. Diodes D3 and D4 together with capacitor C14 and C15 comprise diode limiting for application to transistor Q7. By judicious selection of resistors R21, R22, and R23, the operating potential at the collector of transistor Q7 is such that regardless of the input voltage to the base of transistor Q6, the output voltage will range about the operating point between a positive 0.6 volts and a negative 0.6 volts or 1.2 volts peak to peak. Thus, as the limiting circuit attempts to amplify the signal applied to the base of transistor Q6, the diodes D3 and D4 conduct thereby preventing further amplification of the applied signal above the predetermined voltage, which was exemplified as plus or minus 0.6 volts.

As seen in FIG. 2, the amplitude limiting effect is accomplished across the diodes D3 and D4 for both the positive and negative signal. Such limiting is termed symmetrical limiting in that the limiting effect is symmetrical for both the positive and negative signals. It is noted that the effect of nonsymmetrical limiting is that a component of the carrier signal appears in the video output signal. This does not present a problem in FM radio detectors because the carrier leak component can easily be separated by filters since it falls several octaves above the intermediate frequency. In facsimile applications, however, this component falls just above the video band and to filter it out would be difficult and expensive. For this reason, therefore, considerable care has been taken to insure that limiting takes place only at the diodes D3 and D4.

The 1.2 volt peak to peak signal is now applied to capacitor C17 which also operates as a coupling capacitor to isolate the DC operating potentials between sections of the circuit described herein. Resistors R24 and R25 are coupled to positive +V and negative −V supply potentials and are coupled to the base of transistor Q8. Resistors R26 and R27 are similarly coupled to positive and negative supply voltages and, with transistor Q8 operating as an amplifier, the signals are amplified to a level which, for example, from a 1.2 volt peak to peak input signal to a 15 volt peak to peak output signal now in the format of a rectangular limited wave.

Up to this point the information input signals have been amplified, equalized, and limited. The frequencies of the input signals have remained the same except for the operations as set forth above. Now that the signals have been operated on as hereinabove set forth, the information contained in the received frequency signals must be detected in order to recover the original transmitted video or data information. Thus, the output from transistor Q8 in FIG. 2 is now applied to capacitor C18 and resistors R28 and R29 in FIG. 3. These components act as a differentiator which differentiate the input rectangular signal as appearing on the output of transistor Q8. At each positive and negative going edge of the rectangular input waveform the differentiator circuit will generate a positive or negative voltage spike pulse in accordance with each of said edges. Thus, the input sine wave information received at the preamp in FIG. 2 has been now transformed into positive and negative voltage pulses in accordance with the point where the sine waves cross the long term zero potential axis. These positive and negative voltage pulses, are not entirely useful in this format, however, and must be transformed into a signal which can be recovered as the original transmitted data or video information.

Transistor Q9 is coupled to the output of the differentiator circuit and when the negative voltage spike pulses are applied to the base of transistor Q9, the transistor conducts from ground through diode D5. With transistor Q9 now conducting, a narrow pulse is generated at the collector of transistor Q9 which is coupled to a negative voltage supply through resistor R30. The diode D5 provides its own internal resistance drop which slices any noise which may appear on a line along with the negative voltage spike pulses. Coupled to resistor R30 is resistor R30*a* and resistor R31 to transistor Q10*a* which operates as an inverter circuit to invert the voltage spikes to negative going pulses.

The positive voltage spikes are applied to the base of transistor Q10 which, when appearing on the input thereof, turns the transistor Q10 on which conducts from the positive voltage supply +V through resistor R33 and transistor Q10 through diode D6 to ground. These negative going positive pulses are then shifted about the zero potential axis due to the operation of resistors R34 and R35 coupled to negative voltage supply −V. The output now from transistors Q10 and Q10*a* are applied through resistors R36 and R37, respectively, to the base of transistor Q11. With each of the pulses which appear from transistors Q10 and Q10*a*, transistor Q11 will be turned on. When this transistor is turned on, capacitor C19, which had been charging from the negative voltage supply −V through resistors R38 and adjustable resistor R39 to said negative potential, is discharged. When Q11 is turned off again at the end of the negative pulses, which are approximately 10 microseconds, for example, in duration, capacitor C19 begins to charge toward the negative voltage supply −V through resistors R38 and R39.

Transistors Q12 and Q13 and associated resistors R41, R42, R43, R44, and R45 comprise a Schmitt trigger circuit. This circuit operates to make up a negative recovery time one-shot. That is, the voltage at the collector of transistor Q12 approaches a predetermined voltage whenever capacitor C19 is discharged and stays at this potential until the capacitor C19 charges up to the trigger point of the Schmitt trigger. At this point the collector of transistor Q13 will switch to the potential of approximately the negative voltage supply −V. As hereinabove set forth, the Schmitt trigger has been said to be a negative recovery one-shot in that no pulse applied to it will be lost due to the cycle time of the Schmitt trigger. In standard one-shot circuits, any trigger pulse which occurs during the output pulse or for a period thereafter, known as the recovery time, will have no effect and the information it contains will be lost. In facsimile applications, distortion may occur due to loss of some of these pulses. The one-shot Schmitt trigger used in this application has no recovery time and can even be retriggered during the output pulse. Two benefits accrue from the use of such a circuit. No pulses will be lost though some error may result from "overlap." That is, retriggering during the output pulse results in the loss of the remainder of that pulse. Thus, the signal gradually degrades if "overlap" increases. Since recovery time is not a problem, however, a much longer pulse can be used which increases the conversion gain of the demodulator.

From the collector of transistor Q13, the output rectangular signals are applied to the base of transistor Q14. In response thereto, the collector of transistor Q14 switches between −V and +V. This generates a signal of the sum of the absolute values of the minus and plus voltage supplies as a peak to peak signal, for example, of 28 volts. This signal level can now be integrated in order to recover the original transmitted data information.

The output from transistor Q14 is coupled to the bases of transistors Q16 and Q17 coupled as a complementary emitter follower circuit. Positive pulses will enable transistor Q17 while negative going pulses will enable transistor Q16. These transistors will respectively conduct current through the respective supply voltages through resistors R48 and R49 into a low pass filter network. The low pass filter network comprises four stages with resistors R50, R51, R52 and R53, and capacitors C20, C21, C22, and C23, respectively. The output from the fourth low pass filter network is coupled to transistor Q18 which is wired as an emitter follower through resistor R54 to a positive voltage supply +V. The output at the video output line is a varying voltage baseband signal which comprises the original transmitted data or video information as appearing at an associated transmitter. For example, the output signal could be a voltage varying between 0 and 7 volts with a gray scale including white to black inclusive.

The output signal is also coupled through resistor R55 to phase detect and carrier detect circuits. Resistor R56 and capacitor C24 provide additional filtering to provide a sharper signal for phasing purposes as hereinabove set forth. The phase output line from transistor Q22 is utilized to provide phasing pulses to the subsequent phasing circuitry, not shown, for phasing the receiving unit to a transmitting unit.

Resistor R55 is also coupled to the input of a carrier detect circuit comprising transistors Q19, Q20, and Q21. Q19 is used as a switch to detect when the input signal thereto drops below a predetermined voltage level. The resistors R59 and R60 comprise a voltage divider network to place a predetermined voltage on the emitter of Q19. During normal transmission transistor Q19 will be in the off state. Coupled thereto is transistor Q20 through resistor R58. Q20 will also be turned off and capacitor C25 will charge through R61 and R63 to a predetermined voltage value as determined by R61, R63, and R64. This condition keeps transistor Q21 turned on which in turn generates the carrier detect signal at ground potential. When the incoming signal drops below a predetermined frequency, for example, 1400 Hz., transistor Q19 switches on which in turn switches on transistor Q20. Capacitor C25 then discharges through resistor R63 and transistor Q20 to a predetermined voltage level determined by resistors R63 and R64 thereby turning transistor Q21 off which drops the carrier detect signal to the −V supply voltage.

Coupled to transistor Q21 is a switch transistor Q15 which is on when transistor Q21 is off and is off while transistor Q21 is on. With transistor Q15 on the charging rate of capacitor C19 is increased by the additional charging current supplied through resistor R65. This causes the Schmitt trigger one-shot pulse width to be reduced, thereby shifting the video output signal more positive. This shift is predetermined so that the incoming frequency must approach 2200 Hz. to bring the voltage negative enough to turn transistor Q19 off again so that the circuit 10 reverts to its alternate state as originally described. Therefore, the operation of the carrier detect circuit adjusts the generation of pulses by the Schmitt trigger in order to provide for detection of the presence or absence of the incoming carrier frequency for a search of three-forths of a second for loss or attainment of the carrier signal.

Only one potentiometer, R39, is required in the demodulator circuit because the gain is to be adjusted in the printing or marking drive circuit, not shown. The potentiometer is used to set the video output DC level to zero volts, for example, for an input signal of 1500 Hz., hereinabove set forth as white information.

In the foregoing there has been disclosed apparatus for effectively providing a frequency modulated signal demodulator in accordance with received video information from a transmission medium. This specification has been drawn to a facsimile communication system with phasing, carrier detection, etc., in addition to frequency demodulation. Further, various voltage levels and data frequency limits have been disclosed, but it will be apparent, however, that these recitations will be understood to one skilled in the art to be illustrative only as other frequency ranges and values could be utilized within the scope of the present invention.

Moreover, while the invention has been described with reference to specific embodiments, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What we claim is:

1. A frequency modulation signal demodulator comprising
means for receiving said frequency modulation signals and amplifying said signals to a predetermined operating level,
means coupled to said amplifying means for equalizing said frequency modulation signals to correct for distortion characteristics present in said signals,
means coupled to said equalizing means for symmetrically limiting said frequency modulation signals to substantially rectangular shaped signals retaining the frequency modulated characteristics thereof,
first means coupled to said limiting means for generating short duration rectangular shaped pulses in response to the positive and negative going edges of said rectangular shaped signals applied thereto,
second means coupled to said first generating means for generating fixed duration pulses in response to said short duration rectangular shaped pulses applied thereto, said second generating means recycling in response to said short duration pulses where said short duration pulses occur during said generation of said fixed duration pulses, and
means coupled to said second generating means for filtering said fixed duration pulses into the instantaneous average value signal of said fixed duration pulses applied thereto, said average value signal being the demodulated frequency modulation signal.

2. The apparatus as set forth in claim 1 further including
third means coupled to said filtering means for generating phasing signals for a predetermined period of time at the commencement of operation of said frequency modulation signal demodulator, and
means further coupled to said filtering means for detecting the presence of the carrier signal of said frequency modulation signals, said detecting means controlling the operation of said second generating means upon detection of the presence or absence of said carrier signal for a short predetermined period of time.

3. The apparatus as set forth in claim 1 wherein first generating means comprises
means for differentiating said rectangular shaped signals, said differentiated signals comprising positive and negative voltage spike pulses in accordance with the positive and negative going edges, respectively, of said rectangular shaped pulses applied thereto, and
fourth means coupled to said differentiating means for generating said short duration pulses for application to said second generating means in response to said voltage spike pulses.

4. The apparatus as set forth in claim 3 wherein said fourth generating means comprises
first and second transistor switch means being enabled by the positive and negative voltage spike pulses, respectively, and
transistor inverting means coupled to said first transistor switch means to invert the signals generated thereby.

5. The apparatus as set forth in claim 1 wherein said second generating means comprises a negative recovery Schmitt trigger circuit.

6. The apparatus as set forth in claim 1 wherein said symmetrical limiting means comprises
first and second diode means for amplitude limiting said frequency modulation signals about the axis determined by the axis of the long term average value of said frequency modulation signals to prevent the leak of the carrier signal into the subsequent circuitry.

7. The apparatus as set forth in claim 3 wherein said equalizing means includes
means for phase equalizing said frequency modulation signals to correct for phase distortion present in said signals, and
means for amplitude equalizing said frequency modulation signals to correct for amplitude distortion present in said signals.

8. The apparatus as set forth in claim 7 wherein said amplifying means includes
first means for attenuating signals below a first predetermined frequency,
second means for attenuating signals above a second predetermined frequency, said first and second predetermined frequency defining a frequency band wherein said frequency modulation signals occur.

PO-1050
(5/69)

UNITED STATES PATENT OFFICE
CERTIFICATE OF CORRECTION

Patent No. 3,581,220 Dated May 25, 1971

Inventor(s) Allan J. Bell et al

It is certified that error appears in the above-identified patent and that said Letters Patent are hereby corrected as shown below:

Page 1, column 1, below "[45] Patented May 25, 1971"

insert:

--[73] Assignee Xerox Corporation, Rochester, N. Y. --.

Signed and sealed this 9th day of November 1971.

(SEAL)
Attest:

EDWARD M.FLETCHER,JR.
Attesting Officer

ROBERT GOTTSCHALK
Acting Commissioner of Patents